(12) United States Patent
Moran et al.

(10) Patent No.: US 7,979,155 B2
(45) Date of Patent: Jul. 12, 2011

(54) SORT PLAN OPTIMIZATION

(75) Inventors: Brian J. Moran, Shaker Heights, OH (US); Jeffrey S. Owen, Arlington, VA (US); Lisa D. Hardin, Decatur, GA (US); Ajay K. Easo, Chicago, IL (US); Olutayo O. Oladunni, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 716 days.

(21) Appl. No.: 12/031,408

(22) Filed: Feb. 14, 2008

(65) Prior Publication Data

US 2009/0206013 A1 Aug. 20, 2009

(51) Int. Cl.
*G06F 7/00* (2006.01)
*B03B 5/18* (2006.01)
*G06K 9/00* (2006.01)
*B07C 5/00* (2006.01)

(52) U.S. Cl. ........ 700/223; 209/504; 209/584; 209/552; 209/900; 700/222

(58) Field of Classification Search .................... None
See application file for complete search history.

(56) References Cited

U.S. PATENT DOCUMENTS

| | | | |
|---|---|---|---|
| 2008/0000817 A1* | 1/2008 | Kostyniuk et al. | 209/584 |
| 2008/0291486 A1* | 11/2008 | Isles et al. | 358/1.15 |

* cited by examiner

*Primary Examiner* — Gene Crawford
*Assistant Examiner* — Yolanda Cumbess

(57) ABSTRACT

Aspects of the invention relate to systems and methods for improving a sort plan. According to one embodiment, several groups are formed where each group contains articles having an identifier of a hierarchical structure. In certain embodiments, the identifier may include a geographical indication, such as a postal or ZIP code. Further aspects relate to systems and methods for conducting sort plan optimization where at least some prior data is known or otherwise obtainable. In one embodiment, data relating to the quantity of groups within the sort plan, the quantity of articles associated with each identifier, and/or the quantity of articles within each group may be estimated or known. In certain embodiments, such data may be utilized to assign articles to specific bins, including any available bin, and then optimize the sort plan by selecting at least one bin for improvement.

25 Claims, 4 Drawing Sheets

| j | 3-digit ZIP code group j | Number of pieces of mail having ZIP code within ZIP code group j ($a_j$) |
|---|---|---|
| 1 | 090-099 | 697 |
| 2 | 005, 117-119 | 985 |
| 3 | 006-009 | 84 |
| 4 | 010-013 | 223 |
| 5 | 014-017 | 716 |
| 6 | 018, 019, 055 | 78 |
| 7 | 021, 022, 024 | 749 |
| 8 | 020, 023 | 839 |
| 9 | 025-029 | 47 |
| 10 | 030-034, 038, 039 | 573 |
| 11 | 040-049 | 464 |
| 12 | 035-037, 050-054, 056-059 | 850 |
| 13 | 060-062 | 493 |
| 14 | 063-067 | 381 |
| 15 | 068, 069 | 893 |
| 16 | 070-073 | 160 |
| 17 | 074-076 | 377 |
| 18 | 77 | 861 |
| 19 | 078, 079 | 856 |
| 20 | 080-084 | 146 |
| 21 | 085-087 | 106 |
| 22 | 088, 089 | 547 |
| 23 | 090-099, 340 | 259 |
| 24 | 100-102, 104 | 237 |
| 25 | 103, 112, 116 | 347 |
| 26 | 105-109 | 408 |
| 27 | 110, 111, 113, 114 | 905 |
| 28 | 115 | 215 |
| 29 | 120-123, 128, 129 | 18 |
| ... | ... | |
| ... | ... | |
| ... | ... | |
| 169 | 980-982, 988, 989, 998, 999 | 426 |
| 170 | 983-985 | 561 |
| 171 | 995-997 | 688 |

| j | 3-digit ZIP code group j | Number of pieces of mail having ZIP code within ZIP code group j ($a_j$) |
|---|---|---|
| 1 | 090-099 | 697 |
| 2 | 005, 117-119 | 985 |
| 3 | 006-009 | 84 |
| 4 | 010-013 | 223 |
| 5 | 014-017 | 716 |
| 6 | 018, 019, 055 | 78 |
| 7 | 021, 022, 024 | 749 |
| 8 | 020, 023 | 839 |
| 9 | 025-029 | 47 |
| 10 | 030-034, 038, 039 | 573 |
| 11 | 040-049 | 464 |
| 12 | 035-037, 050-054, 056-059 | 850 |
| 13 | 060-062 | 493 |
| 14 | 063-067 | 381 |
| 15 | 068, 069 | 893 |
| 16 | 070-073 | 160 |
| 17 | 074-076 | 377 |
| 18 | 77 | 861 |
| 19 | 078, 079 | 856 |
| 20 | 080-084 | 146 |
| 21 | 085-087 | 106 |
| 22 | 088, 089 | 547 |
| 23 | 090-099, 340 | 259 |
| 24 | 100-102, 104 | 237 |
| 25 | 103, 112, 116 | 347 |
| 26 | 105-109 | 408 |
| 27 | 110, 111, 113, 114 | 905 |
| 28 | 115 | 215 |
| 29 | 120-123, 128, 129 | 18 |
| | ... | |
| | ... | |
| | ... | |
| | ... | |
| 169 | 980-982, 988, 989, 998, 999 | 426 |
| 170 | 983-985 | 561 |
| 171 | 995-997 | 688 |

FIGURE 2

SORT PLAN OPTIMIZATION

TECHNICAL FIELD

Aspects of the invention relate to methods, systems, and devices relating to sort plans for articles having a geographical identifier of a hierarchical structure. More particularly, aspects of the invention relate to dynamically optimized sort plans.

BACKGROUND

Generally, items to be delivered by a postal network, such as the United States Post Office "USPS," are affixed with an address which informs the postal network where the item should be delivered to. The address usually includes a geographical identifier (such as a ZIP code or postal code) which is often in the form of character and/or numerical strings. The geographical identifier identifies a specific geographical area, this area may be as large as several states or provinces, or smaller, such as a single office block or a number of residential properties, for example.

The geographical identifier tends to be of a hierarchical structure. For example, in the U.S. five-digit ZIP codes are often used to represent a defined area of destinations. The first digit represents a group of states (e.g. 6 represents Illinois, Kansas, Missouri and Nebraska), the second and third digits represent an area within that group of states (e.g. 06 represents Chicago). Following the hierarchical structure, the fourth and fifth digits represent a smaller area within the area represented by the preceding digits. An additional four digits are often utilized to define a more precise location. In the United Kingdom, postal codes are used as geographical identifiers. These comprise a one or two letter prefix that defines an area (for example a county), followed by a one or two digit number that defines a smaller area (for example a town), followed by a number and two letters that defines an even smaller area (for example eight houses).

An article to be delivered ("mail") is typically posted into a mail box containing a number of other pieces of mail, each often having a different destination. These delivery articles are collected periodically and are taken to a mail processing facility which receives mail from many other mail boxes and other mail sources. Since all of the mail is not intended for the same address it must be sorted so that mail going to similar geographical places is grouped together. Often, a batch of mail is sorted by a mail sorting machine that sorts the mail based on the geographical identifier associated with each article. Mail sorting machines have a limited number of bins and as such it is not possible to provide a separate bin for each unique geographical identifier.

A sort plan defines how articles are to be sorted based upon their geographical identifier. In one example, mail having the same geographical identifier to the same predetermined hierarchical level is grouped together. For example, mail having a geographical identifier starting with '6' may be sorted into the same bin (i.e. 6XXXX, where X represents any digit). This bin, or group, of mail needs to be further sorted since the geographical identifier prefix '6' still refers to a relatively large area. Therefore, a further sort is performed on the group of mail. Mail having the same geographical identifier to a second predetermined hierarchical level may then be grouped together. For example, mail having a geographical identifier starting in '606' may be sorted into the same bin (i.e. 606XX, where X represents any digit). Thus, one problem arises when determining how much mail should be classified together. The predetermined hierarchical level may vary depending on the volume of mail. Often, however, the volume of mail is not fixed and will fluctuate over time. Combining too much mail together may force additional costly sorts to further define specific groups within the original sort. Not combining enough mail may introduce inefficiency to the system. Further, because the number of sorts that takes place is proportionate to the cost of sorting the mail, it is desirable to reduce the number of sorts.

Currently, sort plans are fixed. Fixed sort plans are undesirable due to the fact that the volume of mail having a particular geographical identifier may vary hourly, daily, monthly and/or seasonally, for example. For example, on a weekday there may be a large volume of mail to be delivered to business addresses but on a weekend there may not be very much mail to be delivered to business addresses. However, even though the spread of mail is very different, the sort plan for sorting the mail is the same. Further, larger cities such as Chicago, New York, and Los Angeles traditionally have less mail during seasonal holidays as many residents travel to more rural areas to visit relatives and/or friends. Thus, for at least these reasons, fixed sort plans are not particularly efficient.

SUMMARY

Aspects of the invention relate to systems and methods for improving a sort plan. According to one embodiment, several groups are formed where each group contains articles having an identifier of a hierarchical structure. In certain embodiments, the identifier may include a geographical indication, such as a postal or ZIP code. In other embodiments, each group may comprise articles associated with at least one identifier that is not within another group. Once the quantity of articles in each group is received, the articles having an identifier within a specific group may be assigned to the same bin.

The assignment of articles to the bins may take into account several factors, such as the costs of assigning articles to a bin, whether specific groups are permitted to contain specific articles, geography associated with any articles, capacity of at least one bin, and/or grouping articles having identical identifiers within the same bin.

Further embodiments are directed towards selecting one or more bins for improvement. As will be appreciated by those skilled in the art, the selection of bins may depend on a myriad of factors, as discussed in more detail below. In further embodiments, the number of available bins may be determined, where "available" bins are any bins that are not at capacity or otherwise underutilized, including bins that were not considered in the original sort plan which is now being optimized. The quantity of articles assigned to the selected bin(s) may be determined. In one embodiment, the determination considers the articles that are associated with a predetermined hierarchical level of the identifier. Any articles that are associated with the predetermined hierarchical level of the identifier may then be assigned to an available bin.

Further aspects of the invention relate to systems and methods for conducting sort plan optimization where at least some prior data is known or otherwise obtainable. As one skilled in the art will understand, every data point is not required to be known. Rather, some data points may be known, other data points may be estimated, while others may not be obtainable. In one embodiment, data relating to the quantity of groups within the sort plan, the quantity of articles associated with each identifier, and/or the quantity of articles within each group may be estimated or known. In certain embodiments, such sort plan data may be utilized to assign articles to specific bins, including any available bin, and then optimized by selecting at least one bin for improvement.

Still yet further aspects of the invention relate to computer-readable mediums having computer-readable instructions that when executed perform methods for sort plan optimization.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 2 is a table showing an Automatic Area Distribution Codes (AADC) table that may be utilized in a sort plan according to certain aspects of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention. It is further noted that various connections are set forth between elements in the following description. It is noted that these connections in general and, unless specified otherwise, may be direct or indirect and that this specification is not intended to be limiting in this respect.

Figure 1:
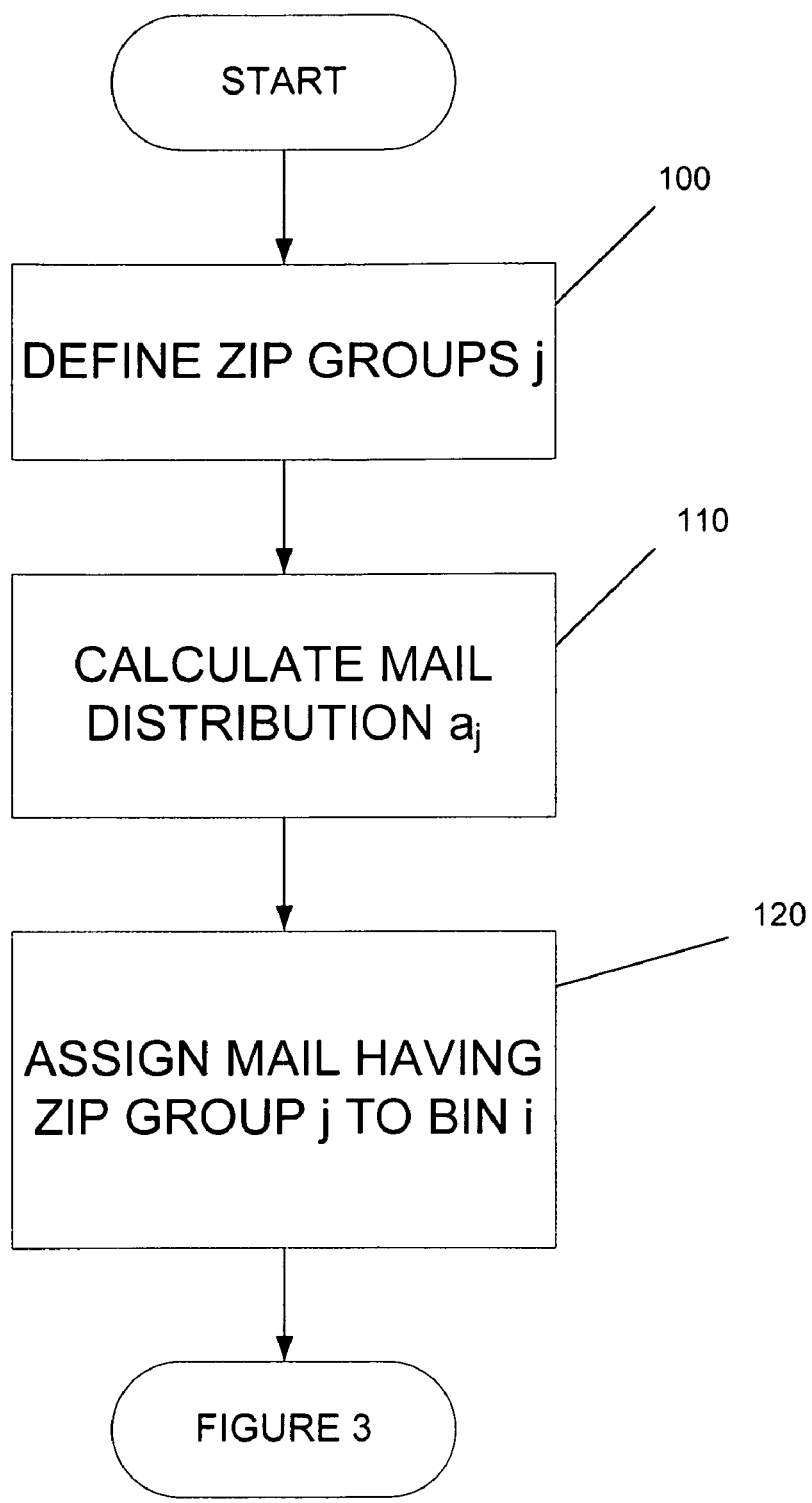
FIG. 1 is a flowchart showing an exemplary method for initially assigning mail to bins consistent with certain embodiments of the invention.

With reference to FIG. 1 and FIG. 2, a plurality of groups utilizing at least a portion of an identifier of a hierarchical structure is defined, wherein each group comprises at least one identifier that is not within another group. For example, in exemplary step 100, shown in FIG. 1, the identifiers are ZIP codes and ZIP code groups j (where j=1 . . . n) are defined. These ZIP code groups are essentially a group of individual ZIP codes. In this embodiment, the groups are predefined by the USPS Automated Area Distribution Codes (AADC) table (as shown in FIG. 2) and as such they may be simply loaded from a database as opposed to being manually defined. In the illustrated example, ZIP code group 1 is all ZIP codes having a 3-digit prefix of 090-099, ZIP code group 2 is all ZIP codes having a 3-digit prefix of 005 or 117-119.

As seen in FIG. 2, there is no requirement that the identifier of a hierarchical structure (i.e., the 3 digit ZIP code) follows in numerical order or completes a full range when defining a ZIP code group. Further, as used throughout this disclosure including the appended claims, the grouping is not required to be entirely hierarchical, but rather may be defined by at least a portion of the hierarchical structure. For example, utilizing mail having a geographical identifier starting in '606XX,' where X represents any numerical digit, the last two digits may not be considered but rather only a portion of the identifier (i.e., the first 3 digits) were considered. As one skilled in the art will readily appreciate upon review of this disclosure, any combination of the digits within the identifier may be considered when defining the groups in step 100.

Further, one skilled in the art will readily appreciate upon review of this disclosure that groups may be defined by other parameters and may be manually defined. Further the identifiers of a hierarchical structure may comprise any alphabetic, numerical, or alphanumeric combination. Yet in other embodiments, the identifiers may comprise an electronic or digital component, or may be wholly electronic or digital. Indeed, while the identifiers chosen are often visually represented, other identifiers within the scope of certain embodiments may not comprise a visual component. Further, while the term "mail" is often used throughout this disclosure, one skilled in the art will readily appreciate that any article configurable to comprise or otherwise be associated with an identifier of a hierarchical structure is within the scope and spirit of the invention.

Step 110 may then be implemented to determine, for each group defined in step 100, the number of articles associated with the identifiers of a hierarchical structure within the group of mail. In certain embodiments, this mimics calculating the mail distribution. In one such embodiment, step 110 may comprise processes for determining for each ZIP code group j, the number of pieces of mail having a ZIP code belonging to that group to obtain ($a_j$). In certain embodiments, this may be done using historical data, such as data loaded from a database from the postal service. For example, the historical data may be hourly, daily, weekly, seasonal or combinations thereof. One skilled in the art will readily appreciate that historical data of other suitable time periods may also be used. In an alternative embodiment, the number of pieces of mail for each ZIP code group may be detected in real-time. This may be done by scanning the address of all incoming mail and determining the ZIP code, for example, by utilizing OCR technology.

As shown in step 120, articles having an identifier within a specific group are assigned to the same bin. For example, utilizing the same above example with articles of mail, each ZIP code group (j) may then be initially assigned to a bin (i) so that mail having a ZIP code within ZIP code group j is assigned to bin i. The number of bins i (where i=1, . . . m) that the mail batch is to be sorted into is defined. The number of bins defined may depend on a myriad of factors, such as all of the bins of a particular sorting machine or some of the bins of a particular sorting machine. As one skilled in the art will readily appreciate, the number of machines and/or bins may fluctuate over time and among different sorting locations.

In one embodiment, a set of binary variables ($y_{ij}$) and a set of integer variables ($x_{ij}$) may then calculated. In the exemplary embodiment, $y_{ij}$ is essentially an "on/off" function that defines what bin i mail carrying a ZIP code of a particular ZIP code group j is to be assigned to. If $y_{ij}=1$ then mail having a ZIP code within ZIP code group j is to be assigned to bin i. However, if $y_{ij}=0$, then mail having a ZIP code within ZIP code group j is not to be assigned to bin i. For example, if $y_{1,1}=1$ then mail having a ZIP code within ZIP code group 1 (i.e. a 3-digit prefix of 090-099) is assigned to bin 1. $x_{ij}$ represents the number of pieces of mail assigned to bin i that have a ZIP code belonging to ZIP code group j.

In one embodiment, the set of binary variables $y_{ij}$ and the set of integer variables $x_{ij}$ are calculated using the following equations:

$$\min \sum_{i=1}^{m} \sum_{j=1}^{n} c_{ij} x_{ij} \quad \text{(Equation 1)}$$

$$\sum_{j=1}^{n} x_{ij} \leq v_i, \text{ for all } i = 1, \ldots, m \quad \text{(Equation 2)}$$

$$\sum_{i=1}^{m} x_{ij} \geq a_j, \text{ for all } j = 1, \ldots, n \quad \text{(Equation 3)}$$

$$x_{ij} - M y_{ij} \leq 0, \text{ for all } i = 1, \ldots, m \text{ \& } j = 1, \ldots, n \quad \text{(Equation 4)}$$

$$\sum_{j=1}^{n} y_{ij} \leq z_i, \text{ for all } i = 1, \ldots, m \quad \text{(Equation 5)}$$

$$\sum_{i=1}^{m} y_{ij} = 1, \text{ for all } j = 1, \ldots, n \quad \text{(Equation 6)}$$

The cost of assigning a piece of mail to bin i that has a ZIP code that belongs to ZIP code group j is represented by $c_{ij}$. Equation 1 therefore minimizes the cost of assigning the mail to the bins. $c_{ij}$ may either be a constant, i.e. no matter what bin mail is assigned to, the cost is the same; or, $c_{ij}$ may comprise a variable, i.e. it is cheaper to assign particular pieces of mail to particular bins. The cost may depend on a myriad of factors, such as geography.

Parameter $v_i$ represents the maximum number of pieces of mail that bin i can accommodate. $v_i$ may be the same for each bin or it may vary from bin to bin. Equation 2 therefore adds the constraint that for each bin i the total number of pieces of mail assigned to that bin is not greater than the capacity of the bin.

As stated above, parameter $a_j$ represents the number of pieces of mail having a ZIP code belonging to ZIP code group j. This value may be based on historical data (e.g. hourly, daily, weekly, monthly, seasonal) or it may be measured in real-time. Equation 3 therefore adds the constraint that the space available in each bin is sufficient to accommodate the number of pieces of mail having a ZIP code within a particular ZIP code group j assigned to that bin.

The parameter M is introduced in order to link the binary variables $y_{ij}$ and the integer variables $x_{ij}$. Equation 4, therefore, ensures that mail having a ZIP code within a particular ZIP code group j is not split into separate bins. When $y_{ij}=1$, $x_{ij}$ can be any value within a region, whereas when $y_{ij}=0$, $x_{ij}=0$. M can be a constant where M=max$\{a_j\}$, alternatively, M can be replaced with $a_j$.

The parameter $z_i$ represents the maximum number of ZIP code groups j that all the mail assigned to bin i may belong to. Equation 6, therefore, essentially ensures that all mail having a ZIP code belonging to a particular ZIP code group is assigned to the same bin. This ensures that any optimization achieved is not negated or lessened by multiple bins holding mail from the same ZIP code.

Thus, assignment of articles to the bins may consider a myriad of variables selected, such as for example, binary, integer, and combinations thereof. Such variables may represent one or more factors, such as the costs of assigning articles to a bin, whether specific groups are permitted to contain specific articles, geographical considerations associated with the articles, the capacity of at least one bin, grouping articles having identical identifiers within the same bin, and combinations thereof.

In one embodiment, once pieces of mail have been assigned to a bin such as described in relation to FIG. 1 (on the basis of the ZIP code group that the ZIP code of the piece of mail belongs to), an optimization may be performed. This optimization may consider empty bins and/or bins that have a small amount of mail assigned to them. For example, in one embodiment this is done by removing all mail in one bin having a particular ZIP code and reassigning it to a different bin. The bins that mail is reassigned to are known as available bins or specialty bins.

Figure 3:
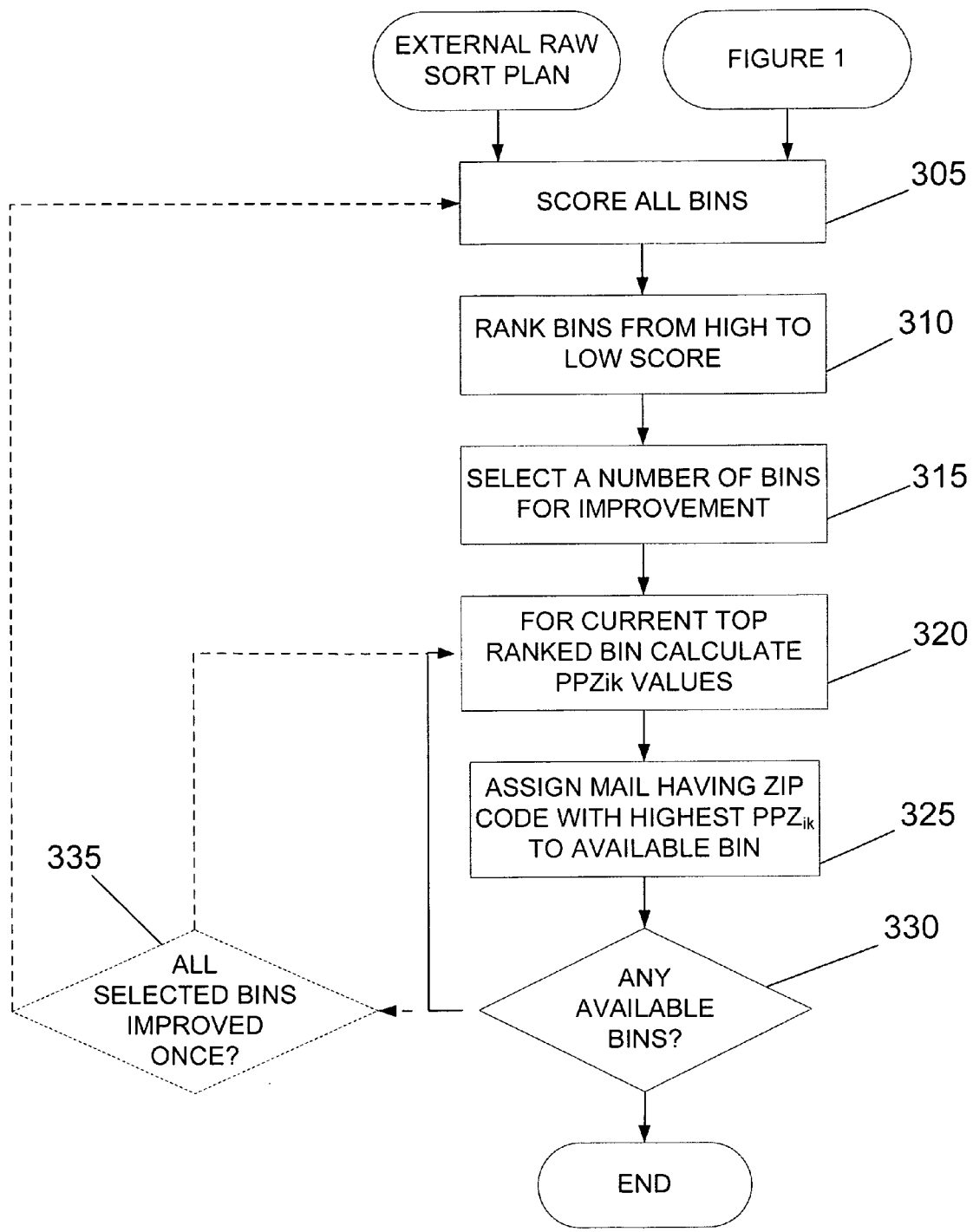
FIG. 3 is a flowchart showing an exemplary method for optimizing sort plans consistent with certain embodiments of the invention.

FIG. 3 illustrates an embodiment of one optimization procedure. One skilled in the art will readily appreciate that one or more steps shown in FIG. 1 are not required to take place before the optimization technique presented in FIG. 3. In fact, a third-party could have already had a sort plan in place, from which data could be obtained or data from a third-party could be utilized. In one such embodiment, data relating to a sort plan for the plurality of groups could be imported into a computer, such as computer 400 (discussed below). Such data may include, for example, the quantity of groups within the sort plan, the quantity of articles associated with each identifier, and a quantity of articles within each group. Such data may be realistic or based upon one or more assumptions.

The first part of the optimization process provided in the illustrated embodiment may involve selecting at least one bin for improvement and determining the number of available bins. Available bins may be defined as being bins that are completely empty, underutilized or otherwise available for use. In one embodiment, the bins are given a score at step 305 which may be based on the number of different ZIP codes that the mail initially assigned to the particular bin has, and the number of pieces of mail in the said bin with each different ZIP code within that group. The number of different ZIP codes (to a predetermined hierarchical level, e.g. 5-digit ZIP code) that the mail in bin i has assigned to it may be represented by k (where k=1 ... $\bar{n}$). The number of pieces of mail in bin i having a ZIP code k is represented by $PPZ_{ik}$. In one embodiment, a threshold value (T) defines the number of pieces of mail having a particular ZIP code in a single bin over which it is desirable to improve the bin. The bin with the highest score is the bin that it is most desirable to improve. At least a portion of the bins may be ranked, for example, as shown in step 310. Various ranking techniques may be known in the art. In one embodiment, at least a portion of the bins are ranked according to Equations 7 and 8, which are provided below.

$$bin(i)_{score} = \sum_{k=1}^{\bar{n}} Q_{ik} \quad \text{(Equation 7)}$$

$$Q_{ik} = \frac{PPZ_{ik}}{T} \text{ if } T > PPZ_{ik} \text{ for each } k \text{ belonging to } i \quad \text{(Equation 8)}$$

$$Q_{ik} = 0 \text{ if } T < 0 \text{ for each } k \text{ belonging to } i$$

The bins with the highest $bin(i)_{score}$ may then be selected as bins requiring improvement (step 315). In various embodiments, this may be a predetermined number of bins, for example the ten bins having the highest $bin(i)_{score}$. In other embodiments, it may be all bins having a $bin(i)_{score}$ over a predetermined threshold, for example all bins having a $bin(i)_{score}$ over 3.0. Yet in further embodiments, the number of bins selected for improvement may be related to the number of available bins. In one example, the number of bins selected for improvement may be the same as the number of available bins.

After selecting at least one bin for improvement and determining the number of available of bins, the quantity of articles assigned to the at least one selected bin that are associated with a predetermined hierarchical level of the identifier may be determined. This may be followed by reassigning the articles that are associated with the predetermined hierarchical level of the identifier to an available bin. In one embodiment, mail having a specific ZIP code may be removed from one of the selected bins and is placed in one of the available bins. It is desirable to reassign mail having the ZIP code which has the highest $PPZ_{ik}$ score. In one embodiment, step 320 may be implemented in which at least the bin with the highest $bin(i)_{score}$ is considered for optimization. In such an embodiment, all mail having the ZIP code which has the highest $PPZ_{ik}$ score may then be reassigned to an available bin (step 325). As shown in step 330, the bin with the second highest $bin(i)_{score}$ (in other words, the bin with the highest $bin(i)_{score}$ excluding the one already improved) may then be considered. As such, all mail having the ZIP code which has the highest $PPZ_{ik}$ score may be reassigned to another available bin. If all of the bins selected for improvement have had mail removed from them and reassigned to an available bin, and there are still available bins left, for example, as determined in step 330, then the bin with the highest $bin(i)_{score}$ may be considered for a second time and mail having the ZIP code which now has the highest $PPZ_{ik}$ score may be reassigned to an available bin. Alternatively, in various other embodiments, step 335 may be implemented to return to step 305, where each and every bin is scored for a second time. In certain embodiments, this process continues until there are no available bins left. Yet in other embodiments, the process may continue for a predetermined amount of iterations.

In certain embodiments it may be important that when mail having a particular ZIP code is reassigned, it is only reassigned to certain bins, such as for example. to ensure that restrictions of an AADC route are maintained. For example, it may not be desirable to reassign mail having a particular ZIP code from bin 10 to bin 200 since bin 10 is intended for Chicago and bin 200 is intended for Seattle. Since the mail having the particular ZIP code was originally assigned to a bin going to Chicago, if it is reassigned, it is desirable to reassign the content of the bin to another bin going to Chicago.

In one embodiment, the available bins that articles are reassigned to ("selected available bins") correlate to a destination that is geographically proximate to the intended destination of the improvement bins. In one such embodiment, the operation of existing sorting machines may be taken into consideration. Most sorting machines are arranged such that the relative distance between sorting bins correlates to a relative distance between the destinations of articles within the specific bins. For example, in most instances, a bin located 2 bins away from a specific bin comprises articles that are intended for delivery to a destination that is relatively closer than the destination of articles located in a bin that is 7 bins away from the same specific bin.

In one such embodiment, the number of ZIP codes "q" to be removed from each improvement bin is determined. For the first ZIP code to be removed (q=1) from the improvement bin i, if bin i+1 is available then it is reassigned to that bin. If bin i+1 is not free then it is reassigned to bin i−1. The same is then done for q=2 for bin i, i.e. reassign to bin i+2 or bin i−2. Depending on various embodiments, this may be done for every q for every improvement bin.

Alternatively, the bins may be grouped into sets wherein each bin in the set contains mail having ZIP codes that are all intended for the same mail center or adhere to the same AADC route. Then, when mail is reassigned from an improvement bin to an available bin, the available bin that the mail is reassigned to must be in the same set as the improvement bin from which the mail is reassigned.

In one embodiment, the creation of a sort plan may be a two-step process. Mail may be initially assigned to bins (steps 100-120) and then this initial assignment of mail may be optimized by improving particular bins (steps 305-335). Again, in various embodiments the optimization process(es) may be separate from the initial assignment of mail to bins. As discussed above, a raw sort plan (or an initial/non-optimized sort plan) may be obtained from an external source (e.g. a client) and optimized, thus providing the client with an optimized sort plan.

In certain embodiments, the optimized sort plan may be applied to a physical mail sorting system that places pieces of mail in bins according to the sort plan. The sort plan may be considered to define a route for mail. In various uses, the sort plan may be altered on an hourly, daily, weekly, monthly or seasonal basis (or any other suitable time period). This provides the benefit that the sort plan being used is specifically configured for specific batches of mail. This may ensure that mail is sorted in a time and/or cost efficient manner. This means that the cost and time for sorting a piece of mail is reduced when compared to systems that use a fixed sort plan.

If the distribution of mail is monitored in real time then the sort plan may be altered in real time in some embodiments. This may further improve the efficiency since the sort plan is based on the actual distribution of mail as opposed to an assumed, historical, distribution of mail.

Figure 4:
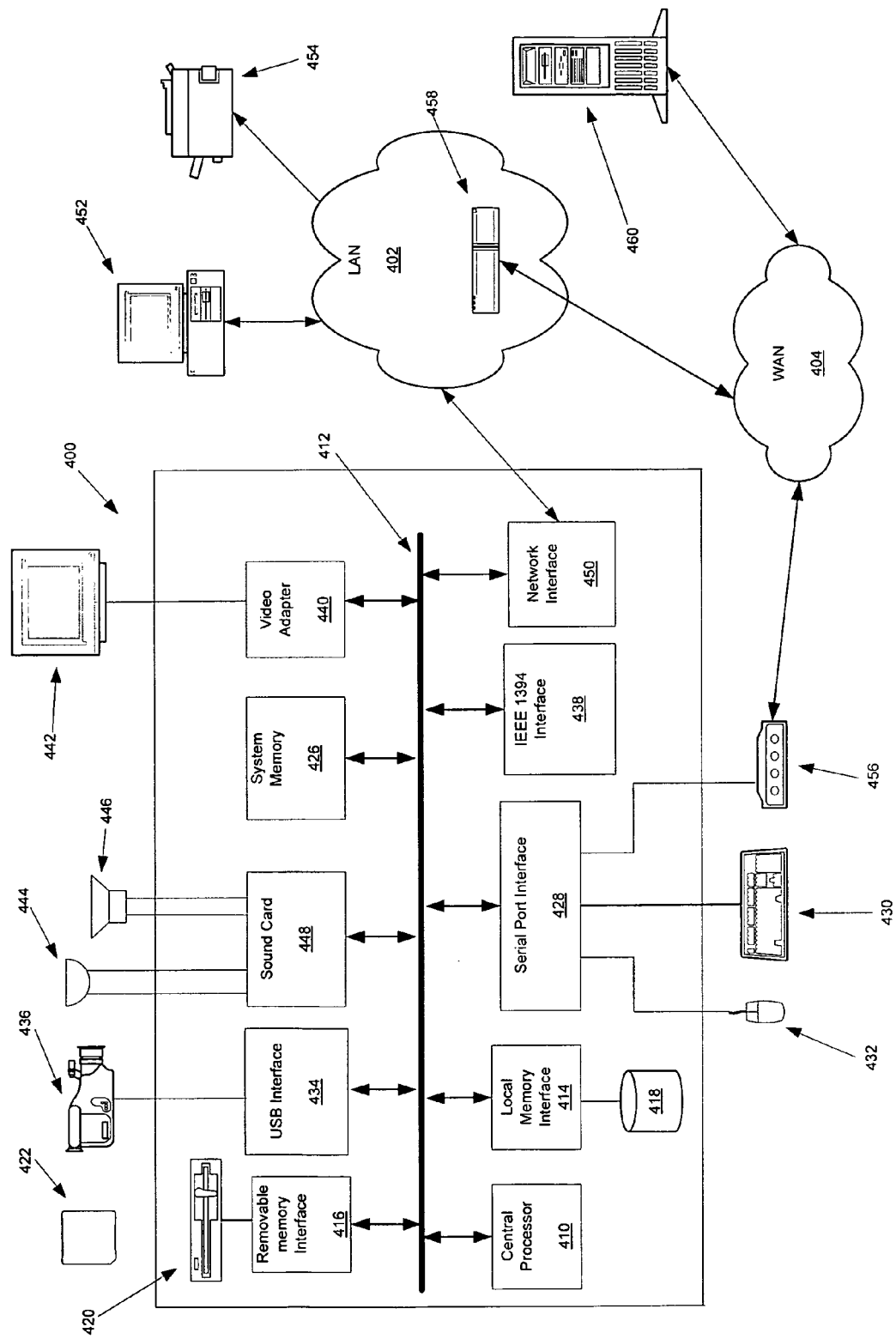
FIG. 4 is a diagram of an exemplary computer that may be utilized in implementing one or more aspects of the invention.

Various embodiments of the present invention may be implemented with computer devices and systems that exchange and process data. Elements of an exemplary computer system are illustrated in FIG. 4, in which the computer 400 is connected to a local area network (LAN) 402 and a wide area network (WAN) 404. Computer 400 includes a central processor 410 that controls the overall operation of the computer and a system bus 412 that connects central processor 410 to the components described below. System bus 412 may be implemented with any one of a variety of conventional bus architectures.

Computer 400 can include a variety of interface units and drives for reading and writing data or files. In particular, computer 400 includes a local memory interface 414 and a removable memory interface 416 respectively coupling a hard disk drive 418 and a removable memory drive 420 to system bus 412. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 418 and a single removable memory drive 420 are shown for illustration purposes only and with the understanding that computer 400 may include several of such drives. Furthermore, computer 400 may include drives for interfacing with other types of computer readable media such as magneto-optical drives.

Unlike hard disks, system memories, such as system memory 426, generally read and write data electronically and do not include read/write heads. System memory 426 may be implemented with a conventional system memory having a read only memory section that stores a basic input/output system (BIOS) and a random access memory (RAM) that stores other data and files.

A user can interact with computer 400 with a variety of input devices. FIG. 4 shows a serial port interface 428 coupling a keyboard 430 and a pointing device 432 to system bus 412. Pointing device 432 may be implemented with a hardwired or wireless mouse, track ball, pen device, or similar device.

Computer 400 may include additional interfaces for connecting peripheral devices to system bus 412. FIG. 4 shows a universal serial bus (USB) interface 434 coupling a video or digital camera 436 to system bus 412. An IEEE 1394 interface 438 may be used to couple additional devices to computer 400. Furthermore, interface 438 may be configured to operate with particular manufacture interfaces such as FireWire developed by Apple Computer and i.Link developed by Sony. Peripheral devices may include touch sensitive screens, game pads scanners, printers, and other input and output devices and may be coupled to system bus 412 through parallel ports, game ports, PCI boards or any other interface used to couple peripheral devices to a computer.

Computer 400 also includes a video adapter 440 coupling a display device 442 to system bus 412. Display device 442 may include a cathode ray tube (CRT), liquid crystal display (LCD), field emission display (FED), plasma display or any other device that produces an image that is viewable by the user. Sound can be recorded and reproduced with a microphone 444 and a speaker 446. A sound card 448 may be used to couple microphone 444 and speaker 446 to system bus 412.

One skilled in the art will appreciate that the device connections shown in FIG. 4 are for illustration purposes only and that several of the peripheral devices could be coupled to system bus 412 via alternative interfaces. For example, video camera 436 could be connected to IEEE 1394 interface 438 and pointing device 432 could be connected to USB interface 434.

Computer 400 includes a network interface 450 that couples system bus 412 to LAN 402. LAN 402 may have one or more of the well-known LAN topologies and may use a variety of different protocols, such as Ethernet. Computer 400 may communicate with other computers and devices connected to LAN 402, such as computer 452 and printer 454. Computers and other devices may be connected to LAN 402 via twisted pair wires, coaxial cable, fiber optics or other media. Alternatively, radio waves may be used to connect one or more computers or devices to LAN 402.

A wide area network 404, such as the Internet, can also be accessed by computer 400. FIG. 4 shows a modem unit 456 connected to serial port interface 428 and to WAN 404. Modem unit 456 may be located within or external to computer 400 and may be any type of conventional modem, such as a cable modem or a satellite modem. LAN 402 may also be used to connect to WAN 404. FIG. 4 shows a router 458 that may connect LAN 402 to WAN 404 in a conventional manner. A server 460 is shown connected to WAN 404. Of course, numerous additional servers, computers, handheld devices, personal digital assistants, telephones and other devices may also be connected to WAN 404.

The operation of computer 400 and server 460 can be controlled by computer-executable instructions stored on a computer-readable medium 422. For example, computer 400 may include computer-executable instructions for transmitting information to server 460, receiving information from server 460 and displaying the received information on display device 442. Furthermore, server 460 may include computer-executable instructions for transmitting hypertext markup language (HTML) and extensible markup language (XML) computer code to computer 400.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 402, 404, but also a "content network," which is comprised of the data—attributable to a single entity—which resides across all physical networks.

Although the above embodiments have been described using ZIP codes, any other type of identifier may be used, for example, postal codes. Further, the articles to be sorted are not limited to mail items. Other examples of articles to be sorted include, but are not limited to, DVDs, videos, CDs.

What is claimed is:

1. A method comprising:

defining a plurality of groups according to at least a portion of an identifier of a hierarchical structure, wherein each group in the plurality comprises multiple identifiers that are not within another group;

assigning articles associated with the same group to the same bin;

selecting a bin for improvement;

comparing, to a threshold, a measure of the quantity of articles assigned to the selected bin; and if the measure satisfies the threshold, then reassigning articles that are associated with a predetermined hierarchical level of a specific identifier of the multiple identifiers associated with the selected bin, but not other articles assigned to the selected bin that are associated with another of the multiple identifiers associated with the selected bin, to another bin.

2. The method according to claim 1, wherein the identifier comprises a geographic identifier.

3. The method according to claim 2, wherein the geographic identifier is a ZIP code.

4. The method according to claim 3, wherein at least a portion of the groups are defined in accordance with an AADC table.

5. The method according to claim 1, wherein the number of articles associated with an identifier within each group is determined based on historical records.

6. The method according to claim 1, wherein the assignment of articles to bins considers factors selected from the group consisting of: costs of assigning articles to a bin, whether specific groups are permitted to contain specific articles, geography associated with the articles, capacity of at least one bin, grouping articles having identical identifiers within the same bin, and combinations thereof.

7. The method of claim 1, wherein the assignment of articles to bins utilizes at least one of the equations:

$$\min \sum_{i=1}^{m} \sum_{j=1}^{n} c_{ij} x_{ij}$$

$$\sum_{j=1}^{n} x_{ij} \leq v_i, \text{ for all } i = 1, \ldots, m$$

$$\sum_{i=1}^{m} x_{ij} \geq a_j, \text{ for all } j = 1, \ldots, n$$

-continued $$x_{ij} - My_{ij} \leq 0, \text{ for all } i = 1, \ldots, m \text{ \& } j = 1, \ldots, n$$

$$\sum_{j=1}^{n} y_{ij} \leq z_i, \text{ for all } i = 1, \ldots, m$$

$$\sum_{i=1}^{m} y_{ij} = 1, \text{ for all } j = 1, \ldots, n$$

wherein,
- i represents a particular bin, i=1, ..., m;
- m represents the number of bins;
- j represents a group, j=1, ..., n;
- n represents the number of groups;
- $x_{ij}$ represents the number of articles having an identifier within group j allocated to bin i;
- $c_{ij}$ represents the cost of assigning an article having an identifier within group j to bin i;
- $y_{ij}$ is a binary variable, $y_{ij}$=1 represents that articles having an identifier within group j are assigned to bin i, $y_{ij}$=0 represents that articles having an identifier within group j are not assigned to bin i;
- $a_j$ represents the number of articles having an identifier within group j;
- $z_i$ represents the maximum number of groups the articles assigned to bin i can belong to;
- $v_i$ represents the number of articles bin i can accommodate; and
- M is a constant, wherein M=max $\{a_j\}$ or M=$a_j$.

8. The method according to claim 7, wherein selecting a bin for improvement comprises:
calculating $$\sum_{k=1}^{\pi} Q_{ik}$$

for each bin, wherein:

$$Q_{ik} = \frac{PPZ_{ik}}{T} \text{ if } T > PPZ_{ik};$$

$$Q_{ik} = 0 \text{ if } T < PPZ_{ik};$$

k represents an identifier of a predetermined hierarchical level, and
$PPZ_{ik}$ represents the number of articles in bin i having identifier k; and
selecting the bin or bins with the highest $$\sum_{k=1}^{\pi} Q_{ik}$$

as the bin or bins for improvement.

9. The method according to claim 8, wherein the specific identifier is the identifier having the highest $PPZ_{ik}$ value.

10. The method according to claim 9, wherein a plurality of bins are selected for improvement and the quantity of bins selected for improvement is about equal to the number of available bins and wherein the other bin that articles are reassigned to is associated with a destination that is geographically proximate to a destination associated with the selected bin.

11. A method comprising:
receiving data relating to a sort plan for a plurality of groups, each group in the plurality containing articles having an identifier of a hierarchical structure, wherein each group in the plurality comprises multiple identifiers that are not within another group, wherein the data comprises:
- a quantity of the plurality of groups within the sort plan;
- a quantity of articles associated with each identifier; and
- a quantity of articles within each group;

assigning the articles associated with the same group to the same bin;
selecting a bin for improvement;
comparing, to a threshold, a measure of the quantity of articles assigned to the selected bin; and
if the measure satisfies the threshold, then reassigning articles that are associated with a predetermined hierarchical level of a specific identifier of the multiple identifiers associated with the selected bin, but not other articles assigned to the selected bin that are associated with another of the multiple identifiers associated with the selected bin, to another bin.

12. The method according to claim 11, wherein the identifier comprises a geographic identifier.

13. The method according to claim 12, wherein the geographic identifier is a ZIP code.

14. The method according to claim 13, wherein at least a portion of the groups are defined in accordance with an AADC table.

15. The method according to claim 11, wherein the assignment of articles to bins considers factors selected from the group consisting of: costs of assigning articles to a bin, whether specific groups are permitted to contain specific articles, geography associated with the articles, capacity of at least one bin, grouping articles having identical identifiers within the same bin, and combinations thereof.

16. The method of claim 11, wherein the assignment of articles to the bins utilizes at least one of the equations:

$$\min \sum_{i=1}^{m} \sum_{j=1}^{n} c_{ij} x_{ij}$$

$$\sum_{j=1}^{n} x_{ij} \leq v_i, \text{ for all } i = 1, \ldots, m$$

$$\sum_{i=1}^{m} x_{ij} \geq a_j, \text{ for all } j = 1, \ldots, n$$

$$x_{ij} - My_{ij} \leq 0, \text{ for all } i = 1, \ldots, m \text{ \& } j = 1, \ldots, n$$

$$\sum_{j=1}^{n} y_{ij} \leq z_i, \text{ for all } i = 1, \ldots, m$$

$$\sum_{i=1}^{m} y_{ij} = 1, \text{ for all } j = 1, \ldots, n$$

wherein,
- i represents a particular bin, i=1, ..., m;
- m represents the number of bins;
- j represents a group, j=n;
- n represents the number of groups;
- $x_{ij}$ represents the number of articles having an identifier within group j allocated to bin i;
- $c_{ij}$ represents the cost of assigning an article having an identifier within group j to bin i;

$y_{ij}$ is a binary variable, $y_{ij}=1$ represents that articles having an identifier within group j are assigned to bin i, $y_{ij}=0$ represents that articles having an identifier within group j are not assigned to bin i;

$a_j$ represents the number of articles having an identifier within group j;

$z_i$ represents the maximum number of groups the articles assigned to bin i can belong to;

$v_i$ represents the number of articles bin i can accommodate; and

M is a constant, wherein M=max $\{a_j\}$ or M=$a_j$.

17. The method according to claim 16, wherein selecting a bin for improvement comprises:
calculating $$\sum_{k=1}^{n} Q_{ik}$$

for each bin, wherein:

$$Q_{ik} = \frac{PPZ_{ik}}{T} \text{ if } T > PPZ_{ik};$$
$$Q_{ik} = 0 \text{ if } T < PPZ_{ik};$$

k represents an identifier of a predetermined hierarchical level, and $PPZ_{ik}$ represents the number of articles in bin i having identifier k; and selecting the bin or bins with the highest $$\sum_{k=1}^{n} Q_{ik}$$

as the bin or bins for improvement.

18. The method according to claim 17, wherein the specific identifier is the identifier having the highest $PPZ_{ik}$ value.

19. The method according to claim 18, wherein a plurality of bins are selected for improvement and the quantity of bins selected for improvement is about equal to the number of available bins and wherein the other bin that articles are reassigned to is associated with a destination that is geographically proximate to a destination associated with the selected bin.

20. A computer-readable medium having computer-readable instructions, that when executed by a processor perform a method comprising:
receiving data relating to a sort plan for a plurality of groups, each group in the plurality containing articles having an identifier of a hierarchical structure, wherein each group in the plurality comprises multiple identifiers that are not within another group, wherein the data comprises:
a quantity of the plurality of groups within the sort plan;
a quantity of articles associated with each identifier; and
a quantity of articles within each group;
assigning the articles associated with the same group to the same bin;
selecting a for improvement;
comparing, to a threshold, a measure of the quantity of articles assigned to the selected bin; and
if the measure satisfies the threshold, then reassigning articles that are associated with a predetermined hierarchical level of a specific identifier of the multiple identifiers associated with the selected bin, but not other articles assigned to the selected bin that are associated with another of the multiple identifiers associated with the selected bin, to another bin.

21. The computer-readable medium according to claim 20, wherein the identifier comprises a geographic identifier.

22. The computer-readable medium according to claim 20, wherein the assignment of articles to bins considers factors selected from the group consisting of: costs of assigning articles to a bin, whether specific groups are permitted to contain specific articles, geography associated with the articles, capacity of at least one bin, grouping articles having identical identifiers within the same bin, and combinations thereof.

23. The computer-readable medium of claim 20, wherein the assignment of articles to bins utilizes at least one of the equations:

$$\min \sum_{i=1}^{m} \sum_{j=1}^{n} c_{ij} x_{ij}$$

$$\sum_{j=1}^{n} x_{ij} \le v_i, \text{ for all } i = 1, \ldots, m$$

$$\sum_{i=1}^{m} x_{ij} \ge a_j, \text{ for all } j = 1, \ldots, n$$

$$x_{ij} - M y_{ij} \le 0, \text{ for all } i = 1, \ldots, m \ \& \ j = 1, \ldots, n$$

$$\sum_{j=1}^{n} y_{ij} \le z_i, \text{ for all } i = 1, \ldots, m$$

$$\sum_{i=1}^{m} y_{ij} = 1, \text{ for all } j = 1, \ldots, n$$

wherein, i represents a particular bin, i=1, . . . , m;

m represents the number of bins;

j represents a group, j=n;

n represents the number of groups;

$x_{ij}$ represents the number of articles having an identifier within group j allocated to bin i;

$c_{ij}$ represents the cost of assigning an article having an identifier within group j to bin i;

$y_{ij}$ is a binary variable, $y_{ij}=1$ represents that articles having an identifier within group j are assigned to bin i, $y_{ij}=0$ represents that articles having an identifier within group j are not assigned to bin i;

$a_j$ represents the number of articles having an identifier within group j;

$z_i$ represents the maximum number of groups the articles assigned to bin i can belong to;

$v_i$ represents the number of articles bin i can accommodate; and

M is a constant, wherein M=max $\{a_j\}$ or M=$a_j$.

24. The computer-readable medium according to claim 23, wherein selecting a bin for improvement comprises:
calculating $$\sum_{k=1}^{\pi} Q_{ik}$$

for each bin, wherein:

$$Q_{ik} = \frac{PPZ_{ik}}{T} \text{ if } T > PPZ_{ik};$$

$$Q_{ik} = 0 \text{ if } T < PPZ_{ik};$$

k represents an identifier of a predetermined hierarchical level, and $PPZ_{ik}$ represents the number of articles in bin i having identifier k; and selecting the bin or bins with the highest $$\sum_{k=1}^{\pi} Q_{ik}$$

as the bin or bins for improvement.

25. The computer-readable medium according to claim 24, wherein the specific identifier is the identifier having the highest $PPZ_{ik}$ value and, wherein the other bin that articles are reassigned to is associated with a destination that is geographically proximate to a destination associated with the selected bin.

* * * * *